US006671827B2

(12) United States Patent
Guilford et al.

(10) Patent No.: US 6,671,827 B2
(45) Date of Patent: Dec. 30, 2003

(54) JOURNALING FOR PARALLEL HARDWARE THREADS IN MULTITHREADED PROCESSOR

(75) Inventors: James D. Guilford, Northborough, MA (US); William R. Wheeler, Southborough, MA (US); Matthew J. Adiletta, Worcester, MA (US); Daniel Cutter, Townsend, MA (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 09/747,018

(22) Filed: Dec. 21, 2000

(65) Prior Publication Data
US 2002/0083373 A1 Jun. 27, 2002

(51) Int. Cl.$^7$ ................................................ S06F 11/00
(52) U.S. Cl. ........................................... 714/38; 703/26
(58) Field of Search .............................. 714/38, 39, 25, 714/30, 31, 11, 12, 13; 703/26, 27, 30; 712/244, 245

(56) References Cited

U.S. PATENT DOCUMENTS

| | | | | | |
|---|---|---|---|---|---|
| 5,953,530 | A | * | 9/1999 | Rishi et al. | 717/127 |
| 6,378,125 | B1 | * | 4/2002 | Bates et al. | 717/129 |
| 6,466,898 | B1 | * | 10/2002 | Chan | 703/17 |
| 6,480,818 | B1 | * | 11/2002 | Alverson et al. | 703/26 |
| 6,526,567 | B1 | * | 2/2003 | Cobbett et al. | 717/124 |
| 6,539,497 | B2 | * | 3/2003 | Swoboda et al. | 714/30 |
| 6,611,276 | B1 | * | 8/2003 | Muratori et al. | 345/772 |

* cited by examiner

Primary Examiner—Nadeem Iqbal
(74) Attorney, Agent, or Firm—Fish & Richardson P.C.

(57) ABSTRACT

A method of debugging code that executes in a multithreaded processor having microengines includes receiving a journal write command and an identification representing a selected one of the microengines from a remote user interface connected to the processor, pausing program execution in the threads executing in the selected microengine, inserting a journal write command at a current program counter in the selected microengine, resuming program execution in the selected microengine, executing a write to a journal routine if program execution in the selected microengine encounters the journal write command and resuming program execution in the microengine.

21 Claims, 3 Drawing Sheets

JOURNALING FOR PARALLEL HARDWARE THREADS IN MULTITHREADED PROCESSOR

TECHNICAL FIELD

This invention relates to a journaling method for parallel hardware threads in a multiprocessor.

BACKGROUND

Parallel processing is an efficient form of information processing of concurrent events in a computing process. Parallel processing demands concurrent execution of many programs in a computer, in contrast to sequential processing. That is, in general all or a plurality of the stations work simultaneously and independently on the same or common elements of a problem.

In a parallel processor where many threads of execution can run simultaneously, there is a need for debugging software running on selected threads. Debugging is used to determine a cause (or causes) of errors in the processing threads, and to correct the errors.

DETAILED DESCRIPTION

Figure 1:
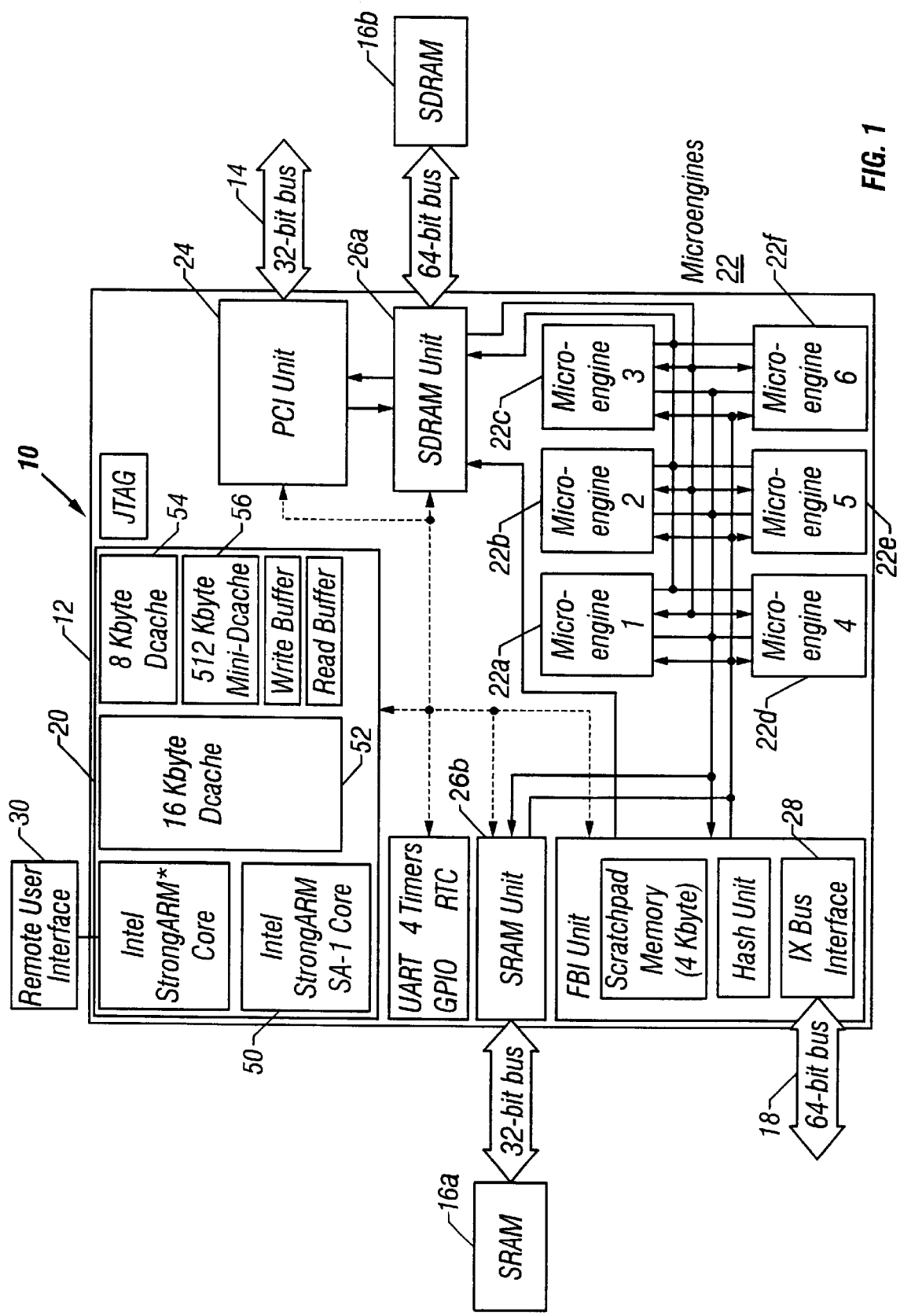
FIG. 1 is a block diagram of a communication system employing a hardware based multithreaded processor.

Referring to FIG. 1, a communication system 10 includes a parallel, hardware based multithreaded processor 12. The hardware-based multithreaded processor 12 is coupled to a bus 12, such as a PCI bus, a memory system 16 and a second bus 18. The system 10 is especially useful for tasks that can be broken into parallel subtasks or functions. Specifically, hardware-based multithreaded processor is useful for tasks that are bandwidth oriented rather than latency oriented. The hardware-based multithreaded processor 12 has multiple microengines 22, each with multiple hardware controlled threads (also referred to as contexts) that can be simultaneously active and independently work on a task.

The hardware-based multithreaded processor 12 also includes a central processor 20 that assists in loading microcode control for other resources of the hardware-based multithreaded processor 12 and performs other general purpose computer type functions, such as handling protocols, exceptions, extra support for packet processing where the microengines pass the packets off for more detailed processing, such as in boundary conditions. In an embodiment, the processor 20 is a Strong ARM® (ARM is a trademark of ARM Limited, United Kingdom) based architecture. The processor 20 has an operating system. Through the operating system, the processor 20 can call functions to operate on microengines 22. The processor 20 can use any supported operating system, preferably a real-time operating system. For a processor 20 implemented as a Strong ARM® architecture, operating systems such as Microsoft NT Real-Time, VXWorks and µCUS, a freeware operating system available over the Internet, can be used.

As mentioned above, the hardware-based multithreaded processor 12 includes a plurality of functional microengines 22a–f. Functional microengines (microengines) 22a–f each maintain a number of program counters in hardware and states associated with the program counters. Effectively, a corresponding plurality of sets of threads can be simultaneously active on each of the microengines 22a–f while only one is actually operating at any one time.

In an embodiment, there are six microengines 22a–f, as shown. Each of the microengines 22a–f has capabilities for processing four hardware threads. The six microengines 22a–f operate with shared resources, including memory system 16 and bus interfaces 24 and 28. The memory system 16 includes a synchronous dynamic random access memory (SDRAM) controller 26a and a static random access memory (SRAM) controller 26b. SRAM memory 16a and SRAM controller 26a are typically used for processing large volumes of data, e.g., processing of network payloads from network packets. The SDRAM controller 26b and SDRAM memory 16b are used in a networking implementation for low latency fast access tasks, e.g., accessing lookup tables, memory from the core processor, and so forth.

The six microengines 22a–f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16b. The microengines 22a–f can execute memory reference instructions to either the SDRAM controller 26a or SRAM controller 26b.

Advantages of hardware multithreading can be explained by SRAM or SDRAM memory accesses. As an example, an SRAM access requested by a thread_0, from a microengine will cause the SRAM controller 26b to initiate an access to the SRAM memory 16a. The SRAM controller 26b controls arbitration for the SRAM bus, accesses the SRAM 16a, fetches the data from the SRAM 16a, and returns data to a requesting microengine 22a–f. During an SRAM 26b access, if the microengine, e.g. microengine 22a, had only a single thread that could operate, that microengine would be dormant until data was returned from the SRAM 26b. By employing hardware context swapping within each of the microengines 22a–f, the hardware context swapping enables only contexts with unique program counters to execute in that same microengine. Thus, another thread, e.g., thread_1 can function while the first thread, e.g., thread_0, is awaiting the read data to return. During execution, thread_1 may access the SDRAM memory 26a. While thread_1 operates on the SDRAM unit, and thread_0 is operating on the SRAM unit, a new thread, e.g., thread_2 can now operate in the microengine 22a. Thread_2 can operate for a certain amount of time, until it needs to access memory or perform some other long latency operation, such as making an access to a bus interface. Therefore, simultaneously, the processor can have a bus operation, an SRAM operation and SDRAM operation all being completed or operated upon by one microengine 22a and have one or more threads available to process more work in the data path.

Each of the microengines 22a–f includes an arbiter that examines flags to determine the available threads to be operated upon. Any thread from any of the microengines 22a–f can access the SDRAM controller 26a, SRAM controller 26b or bus interface. The memory controllers 26a and 26b each include a number of queues to store outstanding memory reference requests. The queues either maintain order of memory references or arrange memory references to optimize memory bandwidth. For example, if a thread_0 has no dependencies or relationship to a thread_1, there is no reason that thread_1 and thread_0 cannot complete their memory references to the SRAM unit 26b out of order. The microengines 22 a–f issue memory reference requests to the memory controllers 26a and 26b. The microengines 22a–f flood the memory subsystems 26a and 26b with enough memory reference operations such that the memory subsystems 26a and 26b become the bottleneck for processor 12 operation. Microengines 22a–f can also use a register set to exchange data.

The processor 20 includes a RISC core 50, implemented in a five-stage pipeline performing a single cycle shift of one operand or two operands in a single cycle, provides multiplication support and 32-bit barrel shift support. This RISC core 50 is a standard Strong Arm® architecture, but is implemented with a five-stage pipeline for performance reasons. The processor 20 also includes a 16-kilobyte instruction cache 52, an 8-kilobyte data cache 54 and a prefetch stream buffer 56. The core processor performs arithmetic operations in parallel with memory writes and instruction fetches. The processor 20 interfaces with other functional units via the ARM defined ASB bus. The ASB bus is a 32-bit bi-directional bus.

Figure 2:
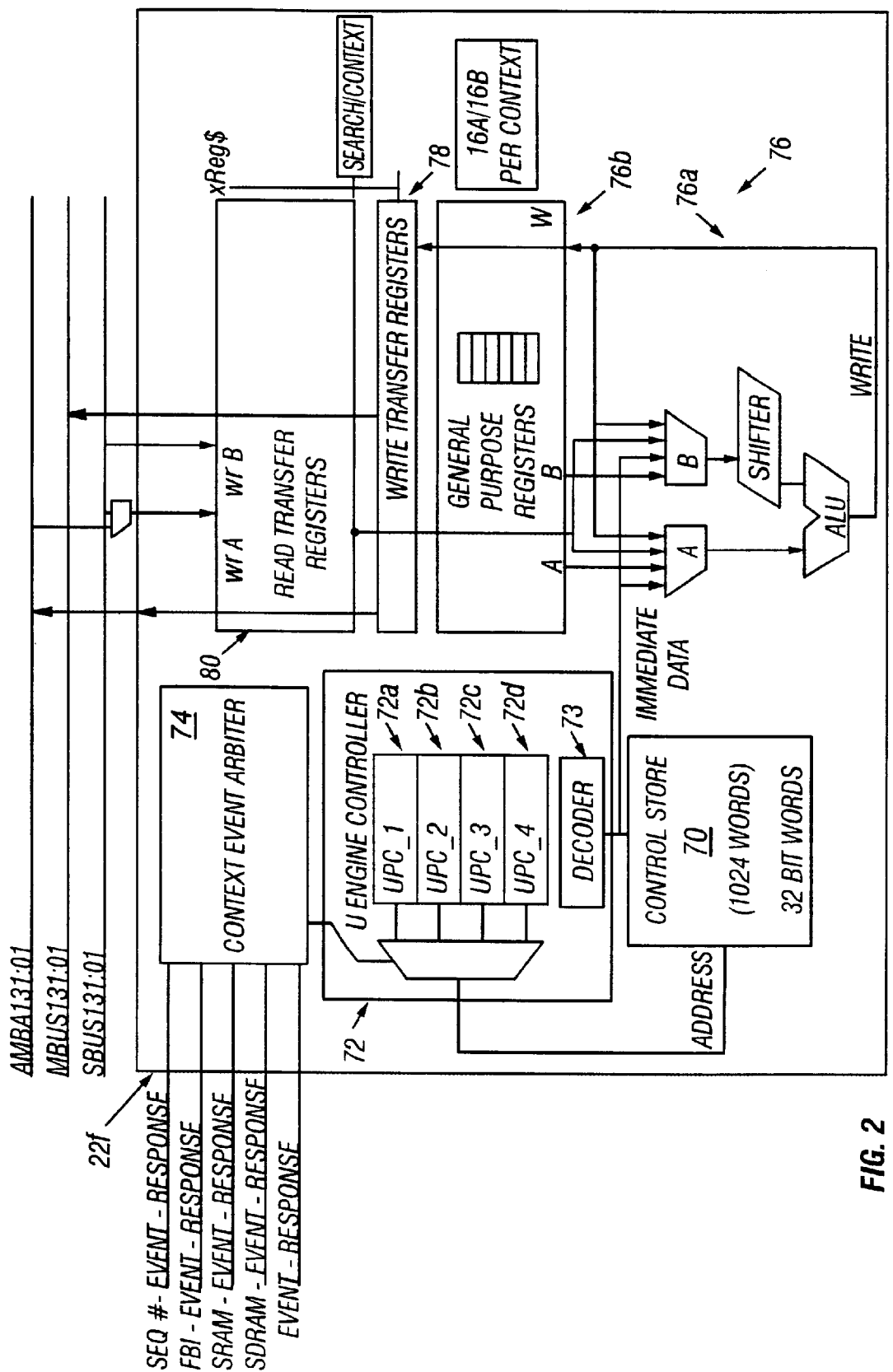
FIG. 2 is a block diagram of a microengine functional unit employed in the hardware based multithreaded processor of FIGS. 1 and 2.

Referring to FIG. 2, an exemplary one of the microengines, microengine 22f is shown. The microengine 22f includes a control store 70, which, in an implementation includes a RAM of here 1,024 words of 32-bits each. The RAM stores eight microprogram. The microprogram is loadable by the processor 20. The microengine 22f also includes controller logic 72. The controller logic 72 includes in instruction decoder 73 and program counter units 72a–d. The four program counters 72a–d are maintained in hardware. The microengine 22f also includes context event switching logic 74. Context event switching logic 74 receives messages from each of the shared resources, e.g., SRAM 16a, SDRAM 16b, or processor 20, control and status registers, and so forth. These messages provide information on whether a requested function has completed. Based on whether or not a function requested by a thread (or context) has completed a signaled completion, the thread needs to wait for that completion signal, and if the thread is enabled to operate, then the thread is placed on an available thread list (not shown). The microengine 22f can have a maximum four threads available in the example of FIG. 2.

In addition to event signals that are local to an executing thread, the microengines 22 employ signaling states that are global. With signaling states, an executing thread can broadcast a signal state to all microengines 22. Receive request available signal, any and all threads in the microengines can branch on these signaling states. These signaling states can be used to determine the availability of a resource or whether a resource is due for servicing.

The context event logic 74 has arbitration for the four threads in the example. In an embodiment, the arbitration is a round robin mechanism. Other techniques could be used, including priority queuing or weighted fair queuing. The microengine 22f also includes an execution box (EBOX) datapath 76 that includes an arithmetic logic unit 76a and general purpose register set 76b. The arithmetic logic unit 76a performs arithmetic and logical functions as well as shift functions. The register set 76b has a relatively large number of general purpose registers. General purpose registers are windowed so that they are relatively and absolutely addressable.

The microengine 22f also includes a write transfer register stack 78 and a read transfer stack 80. These registers 78 and 80 are also windowed so they are relatively and absolutely addressable. The write transfer register stack 78 is where write data to a resource is located. Similarly, the read register stack 80 is for returned data from a shared resource. Subsequent to, or concurrent with data arrival, an event signal from the respective shared resource, e.g., the SRAM controller 26b, the SDRAM controller 26a, or processor 20 will be provided to context event arbiter 74 which will then alert the thread is available or has been sent. Both transfer register banks 78 and 80 are connected to the execution box 76 through a datapath. In an implementation, the read transfer register 80 has sixty-four registers and the write transfer register 78 has sixty-four registers.

Each microengine 22a–f supports multi-threaded execution of four contexts. One reason for this is to allow one thread to start executing just after another thread issues a memory reference and must wait until that reference completes before doing more work. This behavior is critical to maintaining efficient hardware execution of the microengines, because memory latency is significant. Stated differently, if only a single thread execution was supported, the microengines would sit idle for a significant number of cycles waiting for references to return and thus reduce overall computational throughput. Multithreaded execution involves all microengines to hide memory latency by performing useful, independent work across several threads.

When errors occur in software running in one or more of the threads of execution, there is a need for debugging the software running on selected threads to determine a cause (or causes) of the errors and to aid a software developer to correct the errors.

As described above, the multiprocessor 12 has many threads of execution that are supported by the hardware. The core processor 20 runs the ARM instruction set. Each microengine executes one software thread at times, according to its associated program counter. In an embodiment, there are twenty-four hardware-supported threads. Any of these threads can interrupt the core processor 20 by issuing a write operation to a specified control and status register (CSR) referred to as an interrupt register.

Referring to FIG. 1 again, the core processor 20 may be connected to a remote user interface 30. A user (not shown) inputs a journal write command and a microengine identification of a selected microengine to the processor 20. Each microengine has an associated identification.

The core processor 20 pauses the selected microengine, identified by the microengine identification, and inserts a journal write command at the program counter of the program paused in the microengine. Each microengine has an associated processor enable bit. The microengine is enabled when the processor enable bit is set, and disabled when the processor enable bit is not set. Thus, the selected microengine is paused by disabling its associated processor enable bit.

After the journal write command is inserted into the selected microengine, the selected microengine is resumed or restarted. The selected microengine is restarted by enabling its associated processor enable bit. If program execution within the selected microengine encounters the journal write command program counter, the current execution states of the threads in the selected microengine are written to a journal. The journal is in effect a log file. Normal program execution resumes after writing to the journal.

Referring again to FIG. 2, the journal is implemented in hardware in the general purpose registers 76b. Specifically, a subset of the general purpose registers 76b is designated as a journal 86. The journal 86 contains a start register 88 and an end register 90. A current register pointer is stored in register 92. The current register pointer points to the next available register of the journal 86. The current register pointer in register 92 is incremented every time a write to the journal 86 is performed. When the current register pointer points to the end register 90, the register pointer is reset to point to the start register 88 for the next write.

Each write to the journal 86 writes, i.e., logs, the current execution state of a program executing in the multiple threads of execution in the microengine. Examples of current state are whether a particular thread is executing or is paused during a context switch, and so forth.

Figure 3:
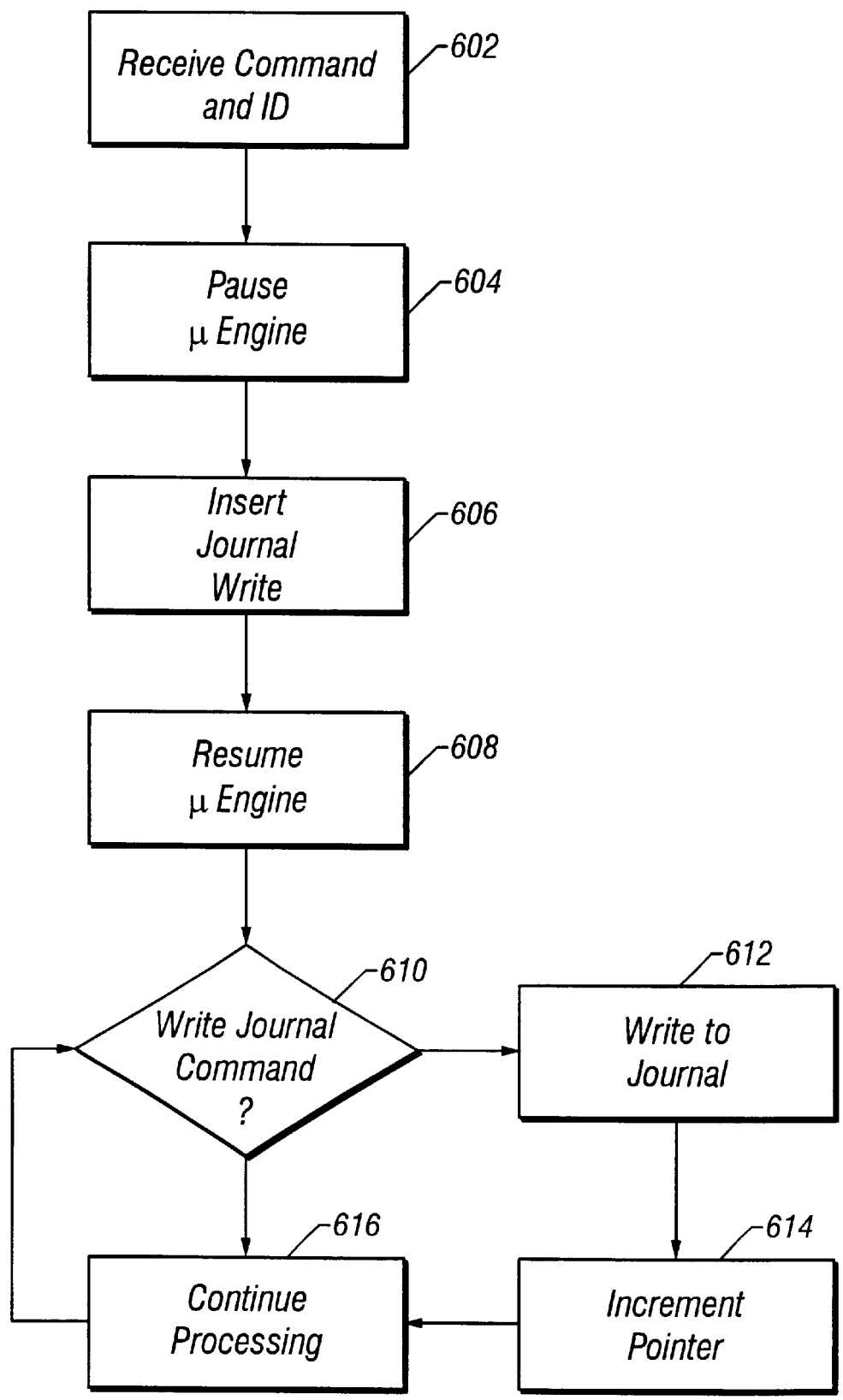
FIG. 3 is a flow chart of a journal method for parallel hardware threads.

Referring to FIG. 3, a journal process 600 in a multi-threaded processor includes receiving 602 a journal command and a microengine ID of a target microengine. The process 600 pauses 604 the target microengine. The microengine is paused by disabling its associated processor enable bit. The process 600 inserts 606 a journal write command at the current program counter of the program executing in the target microengine. The process 600 sets 608 the microengine's processor enable bit causing the microengine to resume processing. If program execution in the microengine encounters the journal write command 610, the execution state of the microengine is written 612 to the journal. The journal is a set of general purpose registers in the microengine. The journal begins with a start register, ends with an end register, and includes a register that maintains a pointer to a current register in the journal to be written to.

After the write to the journal, the process 600 increments 614 the pointer register. If the pointer register points to the end register, the next journal write resets the pointer to the start register. The process 600 continues to execute 616 and writes to the journal upon getting to the write journal command.

An embodiment of the invention has been described. Nevertheless, it will be understood that various modifications may be made without departing from the spirit and scope of the invention. For example, additional writes to the journal may be made at the time the execution state is written, such as adding a time stamp or cycle count. Accordingly, other embodiments are within the scope of the following claims.

What is claimed is:

1. A method of debugging code that executes in a multi-threaded processor having a plurality of microengines comprises:

receiving a journal write command and an identification representing a selected one of the plurality of microengines from a remote user interface connected to the processor;

pausing program execution in the threads executing in the selected microengine;

inserting a journal write command at a current program counter in the selected microengine;

resuming program execution in the selected microengine;

executing a write to a journal routine if program execution in the selected microengine encounters the journal write command; and resuming program execution in the microengine.

2. The method of claim 1 wherein pausing comprises disabling a processor enable bit associated with the selected microengine.

3. The method of claim 1 wherein pausing comprises:

determining when a context swap between the threads occurs in the selected microengine; and disabling a processor enable bit associated with the selected microengine in response to the context swap.

4. The method of claim 1 wherein the journal write command is an instruction to write to a general purpose register.

5. The method of claim 1 wherein the journal is a plurality of general purpose registers.

6. The method of claim 5 wherein one of the plurality of general purpose registers is designated as a start register.

7. The method of claim 5 wherein one of the plurality of general purpose registers is designated an end register.

8. The method of claim 5 wherein one of the plurality of general purpose registers maintains a pointer.

9. The method of claim 8 wherein the pointer indicates a general purpose register to be written.

10. The method of claim 9 wherein the pointer is incremented upon execution of the journal write command.

11. The method of claim 1 wherein executing the write comprises writing execution state of the selected microengine.

12. The method of claim 11 wherein executing the write further comprises writing a time stamp.

13. The method of claim 11 wherein executing the write further comprises writing a cycle count.

14. A processor that can execute multiple contexts and that comprises:

a register stack;

a program counter for each executing context;

an arithmetic logic unit coupled to the register stack and a program control store that stores a journal command that causes the processor to:
        perform a journal write to a journal upon encountering a journal point during program execution; and
        resume program execution.

15. The processor of claim 14 wherein the journal comprises general purpose registers.

16. The processor of claims 14 wherein the general purpose registers comprise:

a start register;

an end register; and a pointer register storing a pointer to a next available register in the journal.

17. The processor of claim 14 wherein the journal point is inserted into the program in response to a user request received through a remote user interface connected to the processor.

18. The processor of claim 14 wherein the journal write writes an execution state of a context.

19. The processor of claim 14 wherein the journal write writes a time stamp.

20. The processor of claim 14 wherein the journal write writes a duty cycle number.

21. A computer program product, disposed on a computer readable medium, the product including instructions for causing a multithreaded processor having a plurality of microengines to:

receive a journal write command and an identification representing a selected one of the plurality of microengines from a remote user interface connected to the processor;

pause program execution in the threads executing in the selected microengine;

insert a journal write command at a current program counter in the selected microengine;

resume program execution in the selected microengine;

execute a write to a journal routine if program execution in the selected microengine encounters the journal write command; and resume program execution in the microengine.

* * * * *